United States Patent [19]

Chen

[11] Patent Number: 4,484,514
[45] Date of Patent: Nov. 27, 1984

[54] BREWING DEVICE FOR COFFEE OR TEA

[76] Inventor: Chia-Jen Chen, Chung-Shan N. Road, Taipei, Taiwan

[21] Appl. No.: 471,032

[22] Filed: Mar. 1, 1983

[51] Int. Cl.³ ............................................ A47J 31/043
[52] U.S. Cl. ........................................ 99/282; 99/283; 99/292; 99/298
[58] Field of Search ................. 99/292, 293, 298, 280, 99/281, 282, 283; 426/433

[56] References Cited

U.S. PATENT DOCUMENTS

| | | | |
|---|---|---|---|
| 2,079,603 | 5/1937 | Davis | 99/292 |
| 2,097,681 | 11/1937 | Wolcott | 99/292 |
| 2,550,513 | 4/1951 | Young | 99/292 |
| 3,345,935 | 10/1967 | Waline | 99/298 |

Primary Examiner—Robert W. Jenkins
Attorney, Agent, or Firm—Shlesinger Arkwright Garvey & Fado

[57] ABSTRACT

A brewing device for either coffee or tea have a water pot bottomed with a base accomodating a heating element and a temperature-sensitive switch connected electrically therewith, by which applying heat to the water pot when being energized and cutting off the source of power at predetermined temperature, and a receiver for coffee grinds or tea to be brewed being disposed by the side of the pot. A U-shaped tube provided between the pot and the receiver having a first leg extended through an first aperture provided in the first lid and a second leg extended through a second aperture provided in the second lid, the former is gas tight sealed with the wall defining the first aperture but on the contrary, there is sufficient opening left between the receiver and the wall defining the second aperture. By such arrangement the water contained in the pot will rise in the first leg till reaching the top of the tube and then descend in the second leg to the receiver by the vapor pressure exerted on the water surface during heating until the water in the pot is exhausted, after de-energized, the brewed beverage in the receiver will return through the bridging means to the pot due to the atmospheric pressure.

16 Claims, 4 Drawing Figures

BREWING DEVICE FOR COFFEE OR TEA

BACKGROUND OF THE INVENTION

This invention relates generally to brewing device and particularly to brewing device for coffee and the like beverage.

Various coffee pots or coffee makers are well known in the art, such as the distillation type coffee maker which including a water receiver and a coffee receiver communicated each other by a substantially U-shaped bridging conduit therebetween. In this type of coffee maker, when applying a heat source to the water receiver, the vapour formed therein will pass through the conduit to the coffee receiver and the condensed water drops will mix with ground roasted beans to brew it. Nevertheless, there are considerable coffee grinds left unbrewed due to the area of water dripping is limited. Another type of coffee makers which utilizing the phenomenon of pressure balance is shown in FIG. 1, which is principally comprised of upper receiver 11 having a tube 13 formed on and extended from the mouth thereof, and a lower receiver 12. The former is extended with the tube 13 into the latter. Both maintain in gas tight relationship and are held together by a stand 17 at the connection neck portion. A filter sieve 15 for laying the coffee grinds is horizontally placed in the receiver 11. When a alcohol burner 18 heats the water-containing lower receiver 13, due to the rising vapour above the water surface, the water will rise in the tube and flow in the upper receiver 11 so as to brew the coffee grinds. After a while, removing the burner 18, the brewed coffee will flow downward to the lower receiver 12.

SUMMARY OF THE INVENTION

It is an object of the present invention to provide a novel brewing device for brewing either coffee or tea.

It is another object of the present invention to provide a brewing device which is operated automatically and more safely.

In accordance with the present invention, a brewing device comprises a first gas tight container for receiving the water, a second container to be juxtaposed to the first container for receiving coffee grinds, means for holding the coffee grinds to prevent them from flowing out of the second container, a U-shaped tube for bridging the first and second containers having a first leg which penetrates through the top wall of and in gas tight sealing relationship with the first container and a second leg penetrating through the top wall of the second container, the second container being communicated with the atmosphere, electric heat source provided at the bottom of the first container, and temperature-sensitive switch in electrical connection with the electric heat source so as to cut off the electricity in the heat source at a predetermined temperature, whereby the water will rise in the first leg till reaching the top of the tube and then descend in the second leg to the second container by the vapour pressure exerted on the water surface during heating until the water in the first container being exhausted, and after de-energized, the brewed beverage in the second container will return through the U-shaped tube to the first container due to the atmospheric pressure.

It is preferred that the U-shaped tube is constituted of seperable tube segments.

Advantageously, the retaining means includes a housing made of mesh.

BRIEF DESCRIPTION OF THE DRAWING

The presently preferred exemplary embodiment will be described in detail with respect to the following drawings, wherein.

DETAILED DESCRIPTION OF THE PREFERRED EMBODIMENT

Figure 1:
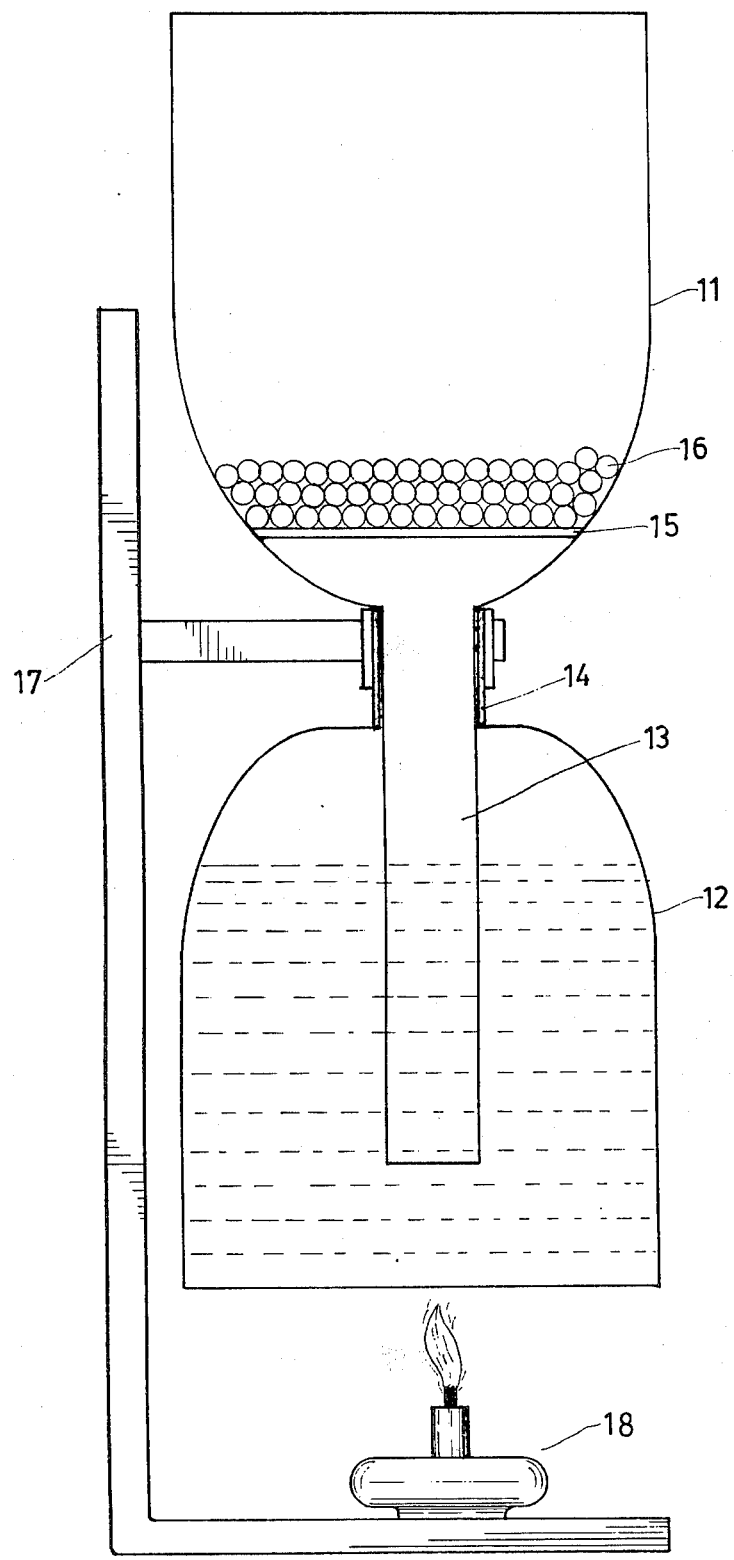
FIG. 1 is a schematic perspective view of a conventional coffee maker.
Figure 2:
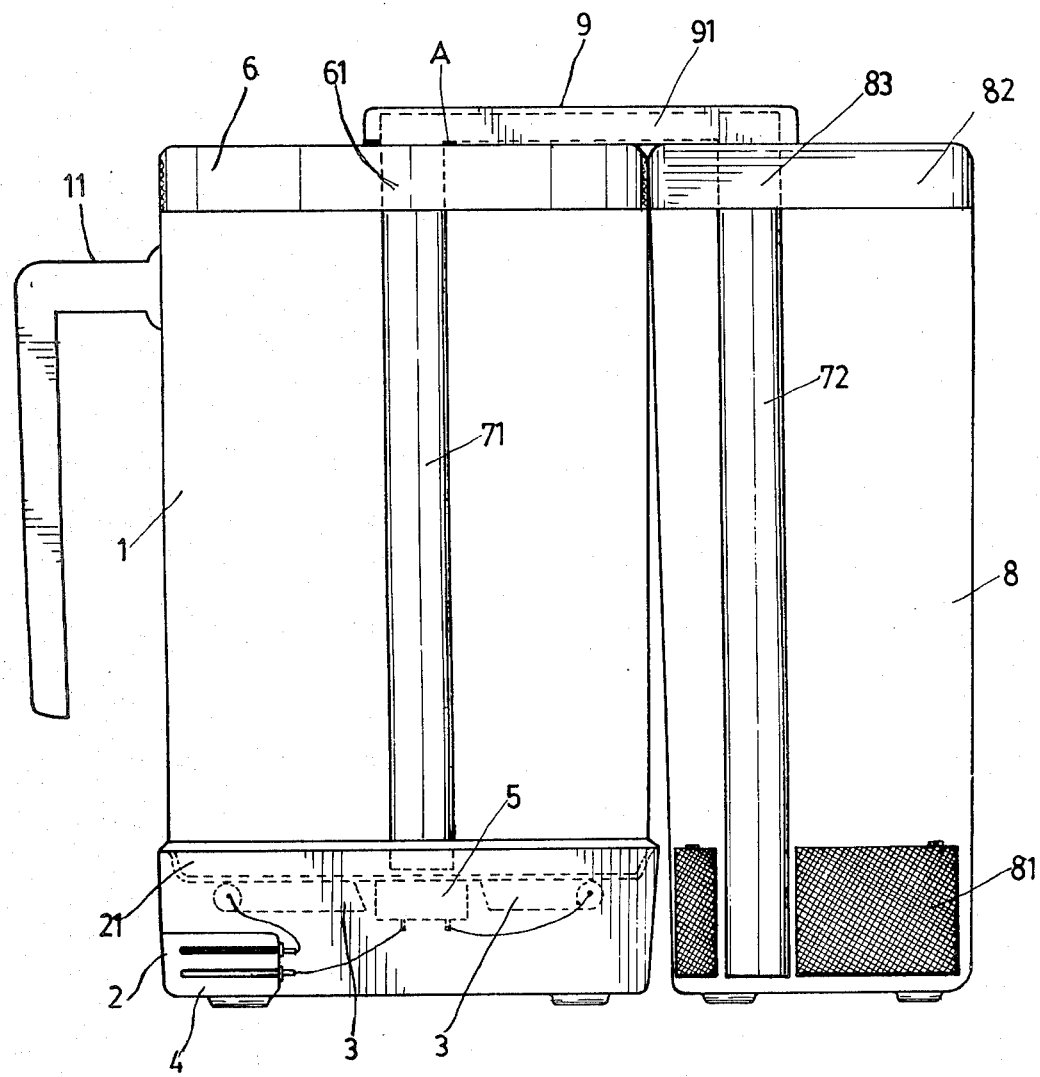
FIG. 2 is a schematic longitudinal section view which showing an embodiment of this invention.
Figure 2A:
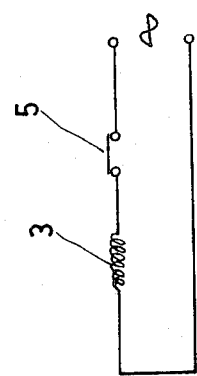
FIG. 2A is a electrical circuit diagram illustrating the connection of heating means and temperature-sensitive switch of an embodiment of the brewing device according to this invention.
Figure 2B:
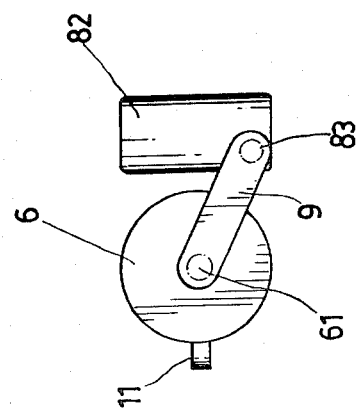
FIG. 2B is a top view of the embodiment of brewing device according to this invention shown in FIG. 2.

Referring now to FIG. 2, the brewing device comprises a pot 1 covered by a first lid 6 having a first aperture 61, which being screwed with the pot 1. A handle element 11 in any desired form is disposed outwardly on the wall of the pot 1 and a carrier plate 21 made of aluminum is fixed on the bottom of the pot 1 by screws. The pot 1 including carrier plate 21 is rest against a electrical type base 2 having a resistive heating element 3, which receives power through an electrical connection 4 and electrically in series with a temperature-sensitive switch 5 as shown in FIG. 2A. The switch 5 will cut off the source of power at a predetermined temperature e.g. 100° C.

A receiver 8 having rectangular cross section and covered by a second lid 82 screwed therewith is separatably disposed by the side of the pot 1 for receiving the coffee grinds or tea to be brewed. On the bottom of the receiver 8 is a housing 81 made of mesh placed for retaining the coffee grinds or tea so as to prevent the insoluble residue from mixing with the brewed beverage. The housing 81 can be designed to have a hinged openable top (not shown) for access of the coffee grinds.

The communication of pot 1 and receiver 8 is achieved by bridging means such as a U-shaped tube 9 which is advantageously comprised of a first leg 71 extended through the first aperture 61 and in gas tight sealing relationship with the wall defining the aperture 61 by inserting a washer A therebetween and a second leg 72 extended through the second aperture 83 in such tightness that the inner space of receiver 8 can be communicated with the atmosphere. A transverse tube segment 91 served as coupling is connected with the first leg 71 and second leg 72 at two ends thereof to complete the U-shaped tube 9.

When the lids and bridging means are set securely, a brewing cycle incorporated with this invention can be carried out by firstly heating the water contained in the pot 1 with the resistive heating element 3. The steam generated from heatin of the water will exert a pressure on the water surface and makes water rise in the first leg 71 till reaching the top 91 of the tube 9 and then descend in the second leg 72 to the receiver 8 to brew coffee grinds and the like until the water in the pot 1 being exhausted. Because the water is flown in stream rather than dripped, the coffee grinds will be noted to dissolve therein more completely. It can be comprehended that the temperature of carrier plate 21 is approximately equivalent to that of the water being heated. Once the water being exhausted, the temperature of carrier plate 21 will rise abruptly beyond 100° C. i.e. a predetermined temperature set in the temperature-sensitive switch 5, and actuate the switch 5 to cut off the electricity. The little amount of vapour remained in the pot 1 is then condensed in the inner wall thereof so that the inner space of the pot 1 is approximately in vacuum. The resulted pressure difference between pot 1 and receiver 8 causes the brewed coffee or other beverage to return through the U-shaped tube 9 to the pot 1.

While the invention has been described in connection with what is presently considered to be the most practical and preferred embodiment, it is to be understood that the invention is not to be limited to the disclosed embodiment but on the contrary, is intended to cover various modifications and equivelent arrangement included within the spirit and scope of the appended claims which scope is to be accorded the broadest interpretation so as to encompass all such modifications and equivalent structures.

I claim:

1. A brewing device, comprising:
   (a) a pot having an open upper end and a closed lower end;
   (b) a lid having an aperture therethrough releaseably sealably secured to said upper end for closing thereof;
   (c) heating means associated with said lower end and adapted for heating a fluid in said pot;
   (d) a receiver juxtaposed to said pot and having an open upper end and a closed lower end;
   (e) a lid having an aperture therethrough releaseably disposed on said receiver upper end for closing thereof;
   (f) brewing material receiving means disposed in said receiver adjacent said lower end and adapted for receiving therein a material to be brewed, said brewing material receiving means having an aperture therethrough;
   (g) a substantially U-shaped hollow tube interconnecting said pot and said receiver and adapted for permitting fluid flow therebetween;
   (h) a first leg of said tube is disposed in said pot and has an upper end thereof releaseably sealably secured in said lid aperture and has a lower end thereof adjacent said pot lower end;
   (i) a second leg of said tube is disposed in said receiver and has an upper end thereof loosely disposed in said lid aperture and is adapted to permit venting of said receiver and has a lower end thereof extending through said brewing material receiving means aperture and adjacent said lower end; and,
   (j) said tube having the base thereof resting on said lids and supporting said tube and maintaining said lower end of each of said legs a predetermined distance from said associated closed lower end whereby heating of fluid in said pot establishes a pressure differential between said pot and said receiver for causing heated fluid to flow through said tube from said pot to said receiver for thereby brewing material in said brewing material receiving means and whereby said brewed fluid flows through said tube from said receiver to said pot in cooperation with a vacuum in said pot caused by cessation of heating by said heating means.

2. The device as defined in claim 1, wherein:
   (a) each of said legs is separable from said base of said tube.

3. The device as defined in claim 1, wherein:
   (a) said first leg lower end is spaced a first predetermined distance from said associated lid;
   (b) said second leg lower end is spaced a second predetermined distance from said associated lid; and,
   (c) said second predetermined distance exceeds said first predetermined distance.

4. The device as defined in claim 1, wherein:
   (a) resilient sealing means are disposed in said pot lid aperture and peripherally engage said first leg upper end for sealing therewith.

5. The device as defined in claim 4, wherein:
   (a) said resilient sealing means includes a washer.

6. The device as defined in claim 1, wherein:
   (a) said brewing material receiving means aperture has a diameter exceeding said second leg lower end diameter.

7. The device as defined in claim 1, wherein:
   (a) said brewing material receiving means includes a mesh housing.

8. The device as defined in claim 1, wherein:
   (a) a handle is secured to said pot.

9. The device as defined in claim 1, wherein:
   (a) a temperature sensitive switch is associated with said heating means and said pot for sensing the amount of fluid in said pot and for preventing operation of said heating means when said pot is substantially exhausted.

10. The device as defined in claim 1, wherein:
    (a) a base is provided for supporting said pot lower end; and,
    (b) said heating means is associated with said base.

11. The device as defined in claim 10, wherein:
    (a) a carrier plate is secured to said pot lower end and is adapted for resting on said base.

12. The device as defined in claim 11, wherein:
    (a) said heating means includes a resistive heating element mounted to said base and adjacent said carrier plate when said carrier plate rests on said base, said resistive heating element is adapted for heating said carrier plate for thereby heating fluid in said pot;
    (b) electrical connection means are disposed in said base and operatively connected with said resistive heating element and are adapted for connection to a source of electrical power to thereby permit operation of said resistive heating element; and,
    (c) temperature sensitive switch means are operatively connected to said electrical connection means and said resistive heating element and are adapted for sensing said carrier plate temperature and for preventing operation of said resistive heating element when said carrier plate temperature exceeds a predetermined temperature.

13. The device as defined in claim 12, wherein:
    (a) said temperature sensitive switch means is adapted for preventing operation of said resistive heating element when said carrier plate temperature exceeds 100° C.

14. The device as defined in claim 1, wherein:
    (a) said pot is generally cylindrically-shaped.

15. The device as defined in claim 14, wherein:
    (a) said pot upper end is threaded around the periphery thereof; and,
    (b) said pot lid has a threaded portion adapted for threaded engagement with said pot upper end threads.

16. The device as defined in claim 14, wherein:
    (a) said brewing material receiving means aperture is aligned with said receiver lid aperture.

* * * * *